US007458512B2

(12) United States Patent
Colson et al.

(10) Patent No.: US 7,458,512 B2
(45) Date of Patent: Dec. 2, 2008

(54) COMPUTER-BASED METHOD AND APPARATUS FOR VERIFYING AN ELECTRONIC VOTING PROCESS

(75) Inventors: Thomas J. Colson, Clarence Center, NY (US); Peter J. Vanderheyden, Naperville, IL (US); Mark R. O'Donnell, Fairport, NY (US)

(73) Assignee: IP.com, Inc., West Henrietta, NY (US)

( * ) Notice: Subject to any disclaimer, the term of this patent is extended or adjusted under 35 U.S.C. 154(b) by 283 days.

(21) Appl. No.: 11/047,782

(22) Filed: Feb. 1, 2005

(65) Prior Publication Data

US 2006/0169777 A1 Aug. 3, 2006

(51) Int. Cl.
*G06K 17/00* (2006.01)

(52) U.S. Cl. ........................................ 235/386; 235/51

(58) Field of Classification Search ................ 235/386, 235/51–57; 705/12

See application file for complete search history.

(56) References Cited

U.S. PATENT DOCUMENTS 5,583,329 A * 12/1996 Davis et al. ............... 235/50 A
7,077,313 B2 * 7/2006 Chung et al. ................ 235/386
7,111,782 B2 * 9/2006 Homewood et al. ......... 235/386
2001/0035455 A1 * 11/2001 Davis et al. ................. 235/375
2004/0046021 A1 * 3/2004 Chung ........................ 235/386
2005/0021479 A1 * 1/2005 Jorba et al. ................... 705/67
2006/0085647 A1 * 4/2006 Neff ........................... 713/180
2006/0138226 A1 * 6/2006 McClure et al. ............. 235/386
2006/0273169 A1 * 12/2006 Fleischman ................. 235/386

* cited by examiner

*Primary Examiner*—Ahshik Kim
(74) *Attorney, Agent, or Firm*—Simpson & Simpson, PLLC

(57) ABSTRACT

The invention broadly comprises a computer-based method and system for verifying an electronic voting process, comprising the steps of generating an original digital fingerprint of an electronic record at a first time and transmitting the original digital fingerprint. The method generates a validation digital fingerprint of the electronic record at a second time later than the first time and compares the original and validation digital fingerprints. The method generates and compares digital fingerprints of voting software during certification and testing, during installation in a voting machine, while the machine is in government possession, and during active use in a voting period.

38 Claims, 17 Drawing Sheets

COMPUTER-BASED METHOD AND APPARATUS FOR VERIFYING AN ELECTRONIC VOTING PROCESS

FIELD OF THE INVENTION

The invention relates generally to electronic voting systems. In particular, the invention relates to a method and system for certifying, using digital fingerprinting, that an electronic voting record and voting software have not been altered.

BACKGROUND OF THE INVENTION

Electronic voting systems and the associated electronic voting records have many advantages over traditional voting systems. Unfortunately, the integrity of electronic voting systems can be compromised, rendering these records less reliable in terms of integrity and ultimately trust on the part of the voter. This lack of reliability complicates efforts to demonstrate control of files and processes in the event of legal proceedings.

There are two obvious opportunities for fraud in connection with electronic voting. The first is with the electronic vote record (EVR). Since EVRs are digital records, they are subject to alteration. In other words, after a voter submits a vote and an EVR is created, that EVR can be fraudulently altered prior to the counting of votes. The second opportunity for fraud in connection with electronic voting is with the voting software itself The software can be altered to create an EVR that contains a vote for a candidate different than the candidate selected by the voter.

Currently "Data Record Electronic" (DRE) systems have a number of internal security features and procedures to deter, or prevent, elicit tampering with the software, firmware, or hardware itself Hereinafter, DRE is used to denote a system used for implementing an electronic voting process. Given the complexity of these systems over their conventional predecessors, and the number of individuals and firm(s) involved in the manufacturing and development of these systems, the systems are left vulnerable to "insider" attack, as well as outsider attack from individuals that possess a moderate level of skill in the computer sciences. There are also other issues that leave these systems vulnerable to outsider attack. Vendors of these systems, though, typically resolve these issues in successive version releases since they realize that voter trust is critical in the acceptance of this relatively new voting method. Eliminating (or at least substantially reducing) voter suspicion in connection with electronic voting systems is fundamental to widespread adoption.

There are currently 4 leading vendors of DRE Voting Systems that are in official use today. Hereinafter, these vendors are referred to as Vendor 1, Vendor 2, Vendor 3, and Vendor 4, respectively. In the case of DRE Voting systems, current security features are illustrated by these four leading vendors' configurations. All of the summarized features are intended to prevent tampering, however none of these features validate the authenticity of data records, or software prior to, during, and after the voting event, to determine if tampering has occurred (or more appropriately, to prove that tampering has not occurred). The methods that these systems employ do not escrow the data or software in a verifiable, legally defensible manner, with an independent auditing firm such as a law firm. The published security features for the vendor systems described below illustrate that the security and validation problems inherent with the DRE Voting Systems currently available. The following paragraphs are excerpts taken from a report published by the State of Ohio providing the results of their DRE selection process. The State of Ohio used the firm "Compuware" to conduct their analysis and provide the assessment report. These excerpts outline all the security features that the respective DRE vendors include on their systems.

Vendor 1: "Voter smart cards are used to allow access to the system. The votes are stored in a random order into separate vote buckets. The vote records are hashed in a random order to prevent determination of the vote order. A voter card controls voter access. The voter card is a smart card issued only from this vendor. Using a card reader to properly identify the precinct of the voter activates voter cards. The information on the voter card only allows the DRE to identify and present the proper ballot for the voter. Immediately after voting the card is disabled and ejected from the DRE and the voter is to return the card to the poll workers. The supervisor's access is limited with a Supervisor's card and a PIN must be entered. The PIN is set by DRE Vendor and is the same for all DREs of this type. The vendor stores ballot definitions and Cast Vote Records on the PCMCIA removable media. The Cast Vote Records are encrypted with a DES encryption package. This vendors system provides an audit log that can be printed out using a specific supervisor function. The audit log produces a report, serving as a paper trail to guard against fraud. This vendor's DRE management system uses the MS Access database to store ballot definition data and election results. There is a risk that an unauthorized person with access to the management system server can access the database and change ballot definition files and election results."

Vendor 2: "The PEB uses a proprietary communication protocol to identify the voter's authorization. Several checks occur including the authenticity of the PEB. The ballot data is check summed and validated when read from the PEB. Votes are stored in binary format, in random memory buckets as each voter takes their turn. The randomness is partially seeded with the internal time clock. The Portable Electronic Ballot (PEB) is keyed to an election by using an internally generated ID that is unknown to anyone using the system. At insertion the PEB is immediately disabled from anyone else using it. There are separate PEBs that only allow administrative functions, which are also password protected. There is no use of encryption by this vendor on any of the data files. Data is not encrypted when being loaded into the voting unit. There are some safeguards such as the use of a binary format and the infrared communications that prevent an unauthorized access. The only way to gain supervisor rights to the DRE is by using a supervisor PEB for that specific election and by knowing the hard-coded passwords."

Vendor 3: "The vote records are stored randomly in the storage media (Mobile Ballot Box (MBB), internal memory of the voting unit and Judges Booth Controller (JBC)). An appropriate algorithm is implemented in the code to store the data randomly and without time stamp. The source code for JBC generates unique access codes for a precinct. Voters use these codes to access the voting unit device and cast their votes. These access codes are valid only for a specified time (which is set in the BOSS system) and the voting unit does not accept these codes after that time has expired. Vote and audit information is stored in 3 places—MBB, internal memory, and JBC. In the event of a disaster, the SERVO software can re-create MBBs with data from either the JBC or eSlate devices. System alerts are given in case of errors during data transmission between eSlate units and JBC. No published encryption methodology is used in the system, but the data is stored in proprietary binary format. The voter is identified to the voting unit based on a four-digit PIN generated by the JBC. Communication between JBC and voting units uses RS485 protocol. The data transmitted between these units is not encrypted. After the polls are closed, the MBBs or eSlate units are physically transported to the computer(s) at a central location and are read by the tabulation management software to tally the results."

Vendor 4: "CRC 16 algorithm has been implemented in the code to check for the correctness of the ballot image. Multiple read-write operations are implemented to make sure the data has not changed. This is done between each vote and power up. The vote records are stored in a random order in the results cartridge. A pseudo-random number generator (a 32-bit maximal length random sequence is seeded by the seconds portion of the internal clock) is implemented in the code. The smartcards used by voters are kept valid for a certain time-frame. Logic is implemented to deactivate the card by putting random data once it is used to enter a vote. Using the same card (without activation) gives a visual error message. Recorded Votes and audit logs are stored in redundant memories (the internal memory in the voting unit and the results cartridge). In case of data mismatch, a consolidation card can be created from WinEDS software and used to read results from the voting unit. The type of encryption used on the voter smart card is DES (Data Encryption Standard) signed with SHA-1 (Secure Hash Algorithm). The cryptographic key appears to be derived from the hard-coded seed 1024 (refer to EEPROM_SZ in file Edgemap.h). The vote records and ballot information are not encrypted. Cryptographic signatures for each of the totals data files (ballot images, selection code summary totals and candidate summary totals) are computed and stored in the voting unit and results cartridge. The voting system is not on a network. At the poll location, the results cartridge is inserted into the voting unit and the vote data and audit trail information is stored in the cartridge and internal memory. At close of polls, the results cartridges are physically transported to computer(s) at central location and are read by the WinEDS software to tally the results."

Unfortunately, although current voting systems utilize technologies and processes to prevent attacks on the integrity of the respective voting systems; these systems fail to provide legally defensible proof of the authenticity and integrity of voting records. Moreover, the current systems do not provide any actionable intelligence if a breach in integrity were to occur. The prior art systems lack a means of creating a legally defensible record that will prove that: all vote records and software utilized in the voting process were not tampered with; or some vote records or software were tampered with (if this is the case). This proof must extend from the time that DRE software is certified and DRE systems are approved by an Independent Testing Authority, through to the time that the DRE systems are utilized in the election process, election results are tabulated, and any necessary recounts are implemented.

Thus, there is a long-felt need to provide a means to ensure that electronically cast votes are accurately counted and protected against alteration. Also, there is a long felt need to provide a means to ensure software used in electronic voting systems is protected from alteration from certification throughout the entire voting period.

SUMMARY OF THE INVENTION

The invention broadly comprises a computer-based method for verifying an electronic voting process, comprising the steps of generating an original digital fingerprint of an electronic record at a first time and transmitting the original digital fingerprint. Hereinafter, the terms "digital fingerprint," "digital authentication record," and "alphanumeric identification" are used interchangeably and are understood to have the same meaning. The method also includes generating a validation digital fingerprint of the electronic record at a second time later than the first time and comparing the original and validation digital fingerprints.

In some aspects, the method transmits the original digital fingerprint to a validating entity and the generation of the validation digital fingerprint and the comparison of the original and validation digital fingerprints takes place at the entity. The method also generates a verification receipt including voter information. When the vote is cast during a specified voting period having a beginning and a conclusion, the method generates at least one pre-vote digital fingerprint of the software prior to the beginning, generates at least one voting digital fingerprint of the software up to the conclusion, and compares the at least one pre-vote and voting digital fingerprints to at least one comparison fingerprint.

In some aspects, the method generates a certification digital fingerprint of certified voting software, generates a pre-test digital fingerprint of voting software to be tested prior to the testing, generates a test digital fingerprint of the software after the testing, and compares the certification, pre-test, and test digital fingerprints. In some aspects, the method generates a pre-installation digital fingerprint of software to be installed in a voting machine prior to the installation, generates an installation digital fingerprint of the software after the installation, and compares the pre-installation and installation digital fingerprints to a digital fingerprint selected from the group including the certification, pre-test, and test digital fingerprints. In some aspects, the method generates an agency digital fingerprint of the software on a machine received by a government agency and compares the agency digital fingerprint to a digital fingerprint selected from the group comprising the certification, pre-test, and test digital fingerprints.

It is a general object of the present invention to provide a method and apparatus for confirming that an electronic voting record has not been altered during a voting process.

It is another object of the present invention to provide a method and apparatus for evaluating, throughout a voting process, whether an electronic voting record has been altered.

It is still another object of the present invention to provide a method and apparatus for confirming that voting software in an electronic voting machine has not been altered during a voting process.

It is a further object of the present invention to provide a method and apparatus for confirming that voting software is not altered during certification and testing.

It is a still further object of the present invention to provide a method and apparatus for confirming that voting software is not altered during installation in a voting machine.

It is yet another object of the present invention to provide a method and apparatus for confirming that voting software is not altered while a voting machine is in active use.

These and other objects and advantages of the present invention will be readily appreciable from the following description of preferred embodiments of the invention and from the accompanying drawings and claims.

DETAILED DESCRIPTION OF THE PREFERRED EMBODIMENT

Figure 1:
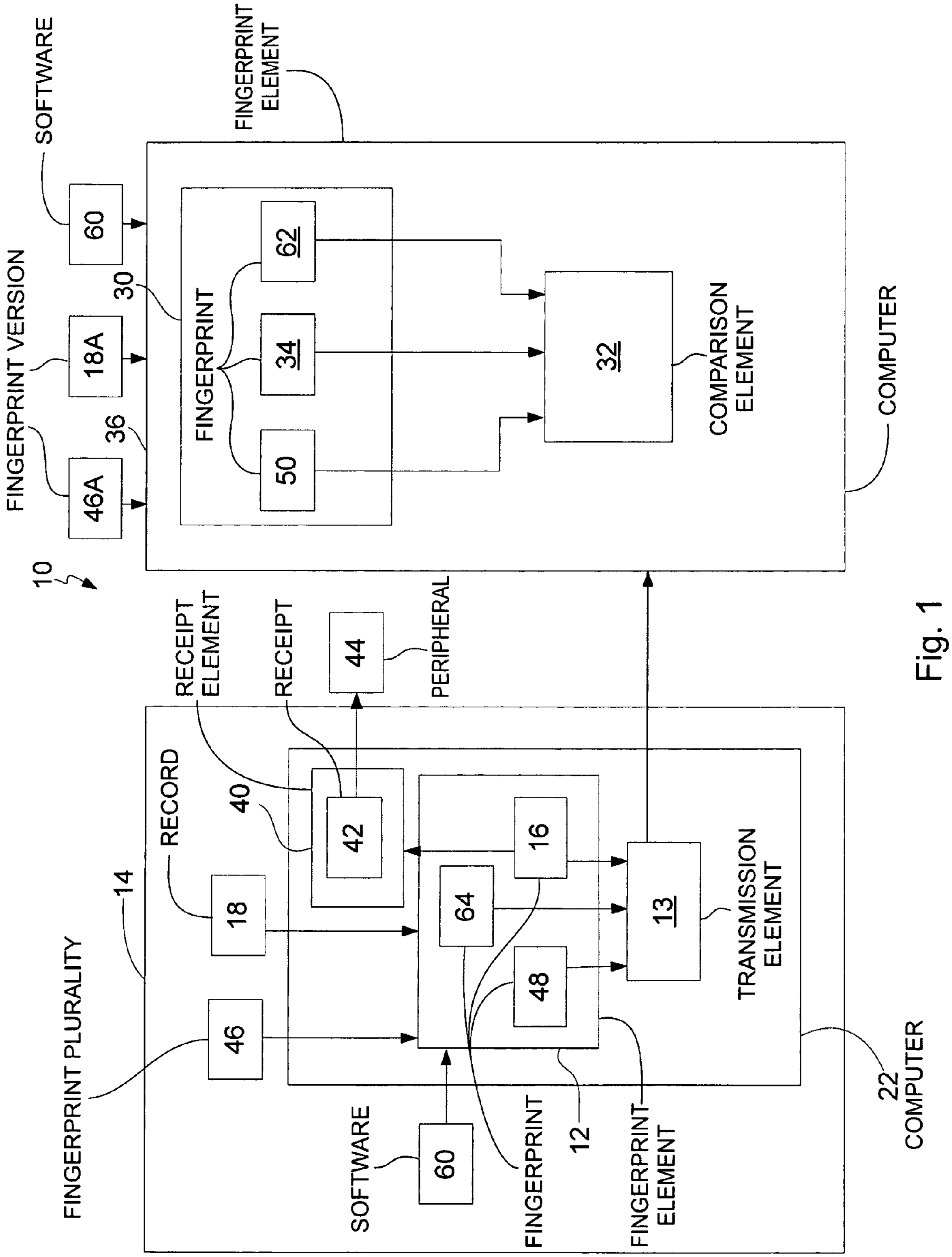
FIG. 1 is a block diagram illustrating a present invention computer-based system for verifying an electronic voting record.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

In the drawings and written description of the present invention, pictures of computer screens taken while operating the present invention are used to illustrate the best mode of the invention known to the inventors at the time of application for patent and to enable those having ordinary skill in the art to use the invention.

The present invention may use the computer-based method and apparatus for certifying a file described in U.S. patent application Ser. No. 10/870,666 (Vanderheyden, Northrup, and Colson), incorporated by reference herein.

FIG. 1 is a block diagram illustrating a present invention computer-based system 10 for verifying an electronic voting record. System 10 includes fingerprint element 12 and transmission element 13, embedded in voting machine 14. In some aspects (not shown), elements 12 and 13 are not embedded in machine 14. Element 12 is operatively arranged to generate digital fingerprint 16 of electronic voting record 18 generated by machine 14 in response to a vote cast by a voter (not shown) using machine 14. In general, machine 14 provides a time and date stamp for record 18 and the time and date stamp is included in fingerprint 16. Fingerprint 16 also is referred to as the original fingerprint. Fingerprint 16 is a unique and highly encrypted electronic fingerprint representing the unique original state of record 18 at the time fingerprint 16 is created. In some aspects, element 12 creates fingerprint 16 substantially contemporaneous with the creation of record 18 by machine 14. By contemporaneous, we mean that fingerprint 16 is generated as soon after the creation of record 18 as is possible using the technology deployed in system 10. This same general meaning of implementing a fingerprinting step as soon as possible is applicable to other usages of contemporaneous below The time span between the creation of record 18 and the generation of fingerprint 16 is kept as small as technically possible, to prevent alteration of record 18 prior to the generation of fingerprint 16.

Transmission element 13 is operatively arranged to transmit digital fingerprint 16. In general, element 13 transmits fingerprint 16 to pre-determined election auditing and/or legal firm(s). However, it should be understood that transmission element 13 can transmit to any entity to which is can be connected. Transmission element 13 is further described below. Fingerprint element 12 and transmission element 13 are located in at least one specially programmed general-purpose computer 22. In FIG. 1, computer 22 is located within voting machine 14. In some aspects, computer 22 is outside of machine 14. Element 12 can use any digital fingerprinting means known in the art. For example, element 12 can utilize one or more of the following hashing algorithms: MD5, SHA-1, HAVAL, RIPEMD128, RIPEMD160, TIGER, GOST. Transmission element 13 can use any transmission means known in the art, for example, modems, telephone landlines, cellular phone technologies, larger area network (LAN)/wide area network (WAN), and satellite communication technologies, to transmit fingerprint 16. Element 13 also can be interfaced with an internet.

All DRE manufacturers have slightly different initialization processes that voters use to access the given DRE system to cast their vote. The present invention is directed to electronic voting records, therefore, for the sake of brevity, the various steps that a voter takes to cast a vote are not described. That is, the description of the present invention starts at the point where electronic voting records are generated by the DRE system. The following describes how system 10 functions with the known DRE systems. However, it should be understood that the present invention is not limited to use with only the systems described supra and that use with other electronic voting machines/systems is included within the spirit and scope of the claims. Thus, the description of system 10 begins as the point where an electronically cast vote is captured by the DRE internal storage media. DRE systems typically store individual voting records as binary files on flash or PCMCIA storage media.

In some aspects, system 10 includes fingerprint element 30 and comparison element 32. Element 30 is operatively arranged to generate digital fingerprint 34 of electronic record 18 some time after element 12 generates fingerprint 16. Fingerprint 34 also is referred to as a validation fingerprint. The process by which element 30 accesses record 18 is described further below. Elements 12 and 30 generate fingerprints 16 and 34, respectively, in real time, minimizing the success of fraudulent activity and providing immediate results. Comparison element 32 is operatively arranged to compare digital fingerprints 16 and 34 and to detect any differences between fingerprints 16 and 34. Fingerprint element 30 and comparison element 32 are located in at least one specially programmed general-purpose computer 36. In FIG. 1, the version of record 18 submitted to computer 36 is designated as 18A to indicate that the version being submitted is not necessarily identical to the version generated by machine 14 when the subject vote was cast. That is, it is unknown at the time of submission as to whether record 18A has been altered. In general, element 30 generates fingerprint 34 at some point after a voter has cast a vote to determine if record 18 has been altered since the voter cast the original vote. Due to the operation of the hashing algorithms, any change or alteration in record 18 after fingerprint 16 has been generated results in fingerprint 34 having a different form than fingerprint 16. Thus, if comparison element 32 detects a difference between fingerprints 16 and 34, it is proof that record 18 has been altered since the generation of fingerprint 16. Thus, fingerprints 16 and 34 can be considered the legal record of the vote and can be used for automatic and legally defensible recounts of election results.

In general, a vote is cast during a specified voting period having a beginning and a conclusion. For example, voting takes place on a specified Tuesday beginning at 7 AM and concluding at 9 PM. Thus, in some aspects, comparison element 32 can be used to compare digital fingerprints 16 and 34 after the conclusion.

In some aspects, computers 22 and 36 are linked using any of the transmission means described above for element 13. In some aspects, computer 36 is in the possession of or operated by a validation entity (not shown), such as the pre-determined election auditing and/or legal firm(s) noted above. In some aspects, system 10 is web-based (not shown) and computers 22 and 36 communicate via a secure web site. That is, computers 22 and 36 and connected through an interface to an internet.

In some aspects, system 10 includes receipt element 40, operatively arranged to generate a verification receipt 42 of electronic record 18. Receipt element 40 is located in computer 22. Receipt 42 provides the voter with a record of their vote. In some aspects, machine 14 is modified to provide a prompt asking a voter, at the final stage of casting a ballot, whether the voter would like a verification receipt as a traceable record of their vote. If the voter selects the prompt, they are asked to create a personal identification number (PIN), and are then presented with the option to send a copy of their receipt to peripheral device 44 for printing. Receipt 42 contains voter identification information generated by machine 14 and may be wholly or partly a digital fingerprint. In some aspects, this identification information includes fingerprint 16. Transmission element 13 transmits all or part of the voter identification information to computer 36. In any case, voter anonymity is preserved, and a traceable fingerprint is presented that can be validated upon presentation to an election auditing firm. The voter can present receipt 42 to computer 36 to confirm that the vote represented by receipt 42 has been properly counted. This process is further described below. In some aspects (not shown), the voter can present receipt 42 through a secure website.

Machine 14 may include a plurality of electronic records 46 gathered by the tabulation of a corresponding plurality of votes cast by respective voters using machine 14. In some aspects, digital fingerprint element 12 is operatively arranged to generate digital fingerprint 48 of plurality 46 at a first time after the tabulation of plurality 46. In some aspects, digital fingerprint element 12 is operatively arranged to generate digital fingerprint 48 of plurality 46 contemporaneous with the tabulation of plurality 46. Fingerprint 48 also is known as a first tabulation digital fingerprint. In some aspects (not shown), a separate digital fingerprint element is included in computer 22 to perform the function of generating digital fingerprint 48. Element 30 is operatively arranged to generate digital fingerprint 50 of plurality 46 at a second time later than the first time noted above. Fingerprint 50 also is known as a second tabulation digital fingerprint. In FIG. 1, the version of digital fingerprint 46 submitted to computer 36 is designated as 46A to indicate that the version being submitted is not necessarily identical to the version generated by element 12. That is, it is unknown at the time of submission as to whether 46A has been altered. In some aspects (not shown), a separate digital fingerprint element is included in computer 36 to perform the function of generating digital fingerprint 50. Comparison element 32 is operatively arranged to compare digital fingerprints 48 and 50.

In some aspects (not shown), system 10 can be used to certify tabulated electronic voting records from a plurality of machines 14. Computer 36 receives respective fingerprints 46 from the plurality of machines and generates a composite fingerprint of all the fingerprints 46. This composite fingerprint can be used by comparison element 32.

In some aspects, system 10 is used to verify electronic voting software 60 installed in electronic voting machine 14. Fingerprint element 30 is operatively arranged to generate at least one digital fingerprint 62 of software 60 prior to the aforementioned beginning of the voting period. Fingerprint 62 also is referred to as a pre-vote digital fingerprint. In some aspects (not shown), a separate digital fingerprint element is included in computer 36 to perform the function of generating digital fingerprint 62. Fingerprint element 12 is operatively arranged to generate at least one digital fingerprint 64 (also known as a voting digital fingerprint) of software 60 up to the aforementioned conclusion of the voting period. In some aspects (not shown), a second digital fingerprint element is included in computer 36 to perform the function of generating digital fingerprint 64. In these aspects, comparison element 32 is operatively arranged to compare digital fingerprints 62 and 64 to at least one comparison digital fingerprint. The composition of the at least one comparison fingerprint is described below. Elements 12 and 30 generate fingerprints 60 and 62 in real time.

FIGS. 2A through 2E are block diagrams further illustrating the use of system 10 to verify electronic voting software. In general, the electronic voting software receives time and date stamps at each step described below, and the respective time and date stamps are included in the respective digital fingerprints described for FIGS. 2A through 2E.

The source code (not shown) for software 60 typically is found in two general forms. Prior to installation in machine 14, software 60 is contained in a source code repository that contains the un-compiled source code for the various systems/units manufactured by a DRE vendor. Once installed in machine 14, the source code includes both raw and/or executable forms. In some aspects, system 10 utilizes any zip utility that employs lzw compression configured with the "preserve folder information" turned off to first create a single compressed file of the various files in software 60. This step enables verification that all files in software 60 have remained in the same exact file order.

The lzw compression of the zip utility creates a single, unique file consisting of each file in software 60. When processed with the hashing agent, the compressed file produces a single, unique number that is representative of software 60 at the time software 60 was fingerprinted. In some aspects, executable files also are compressed using lzw compression by the zip utility, and then process by the hashing agent to generate a single unique number representative of the executable files prior to deployment of machines 14 to the voting districts.

Figure 2A:
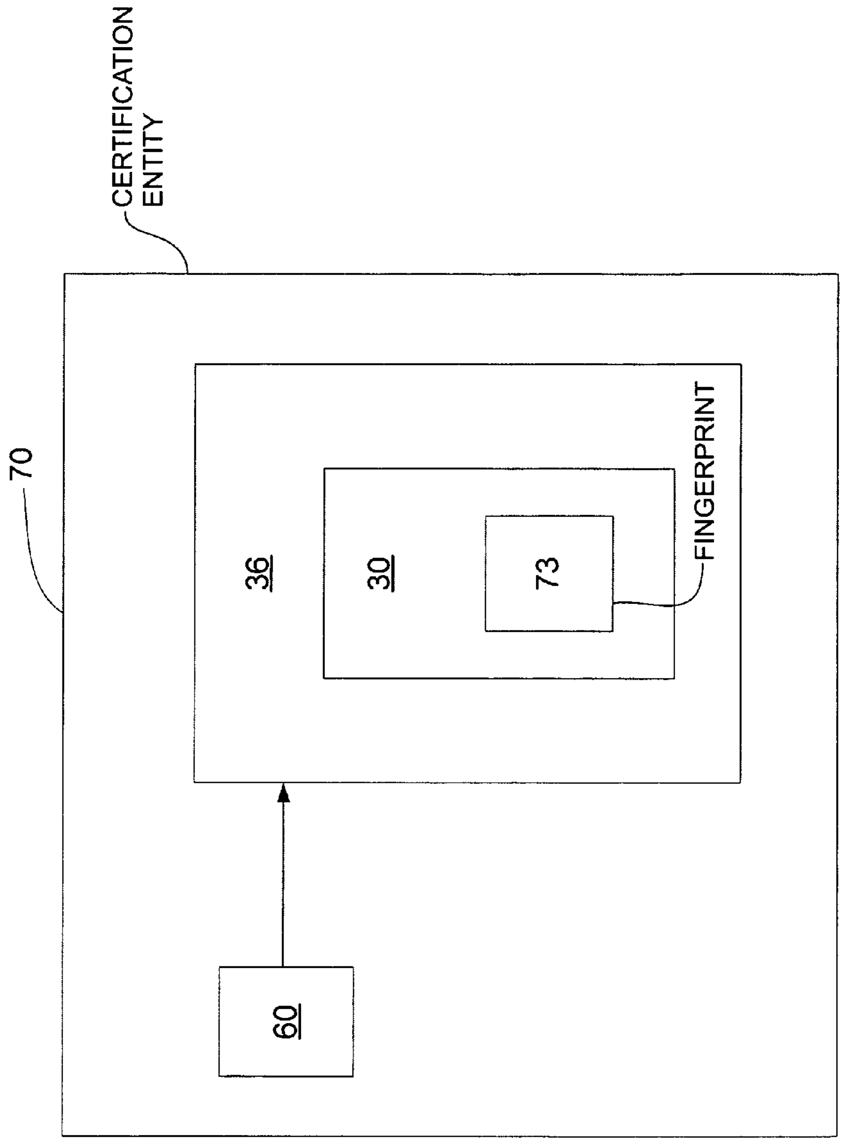
FIGS. 2A through 2E are block diagrams further illustrating the use of the system to verify electronic voting software.

In FIG. 2A, electronic voting software 60 undergoes a process of certification by certification entity 70. In some aspects, fingerprint element 30 is arranged to generate digital fingerprint 73 after the certification of software 60 by entity 70. In some aspects, fingerprint element 30 is arranged to generate digital fingerprint 73 contemporaneous with the certification of software 60 by entity 70.

Figure 2B:
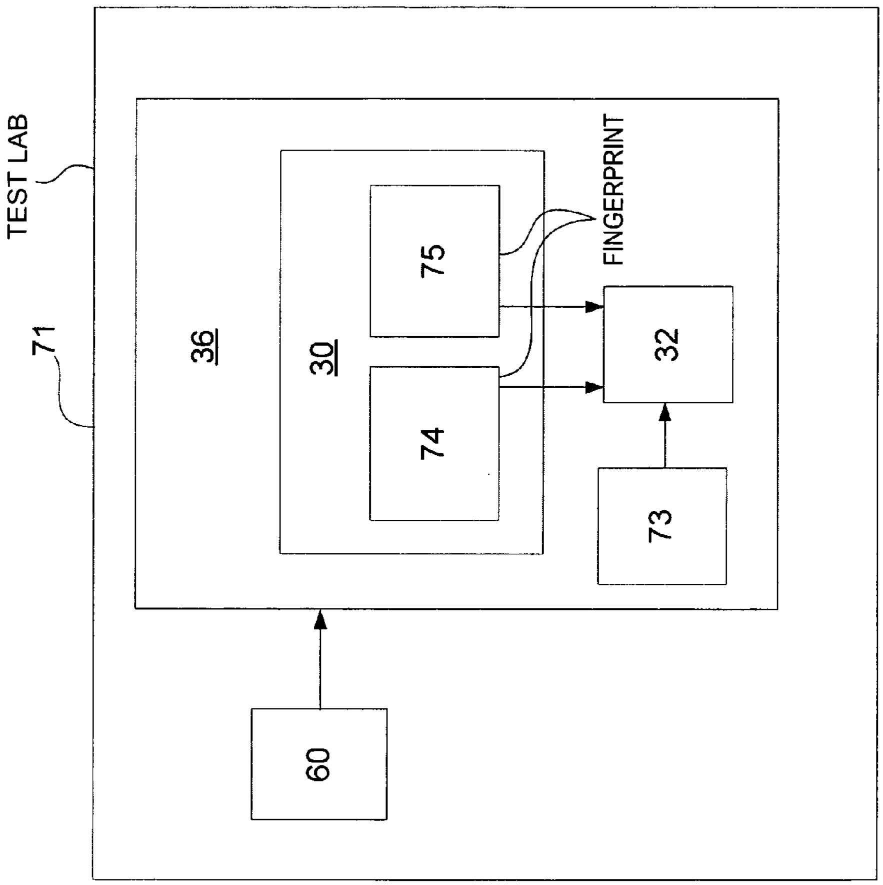

In FIG. 2B, software 60 undergoes testing by independent test laboratory 71. In some aspects, fingerprint element 30 also is arranged to generate digital fingerprint 74 after the certification of software 60 and prior to the testing of software 60 by independent test laboratory 71. Fingerprint 74 also referred to as a pre-test digital fingerprint. In some aspects, fingerprint element 30 also is arranged to generate digital fingerprint 75 after the testing of software 60 by independent test laboratory 72. In some aspects, fingerprint element 30 also is arranged to generate digital fingerprint 75 contemporaneous with the testing of software 60 by independent test laboratory 72. Fingerprint 75 also is referred to as a test digital fingerprint. In these aspects, comparison element 32 is operatively arranged to compare the certification, pre-test, and test digital fingerprints. The preceding operation by element 32 is a specific aspect of the generalized operation of comparing digital fingerprints 62 and 64 to at least one comparison digital fingerprint. The descriptions for FIGS. 2C-2E also contain respective specific aspects of comparing digital fingerprints 62 and 64 to at least one comparison digital fingerprint.

Figure 2C:
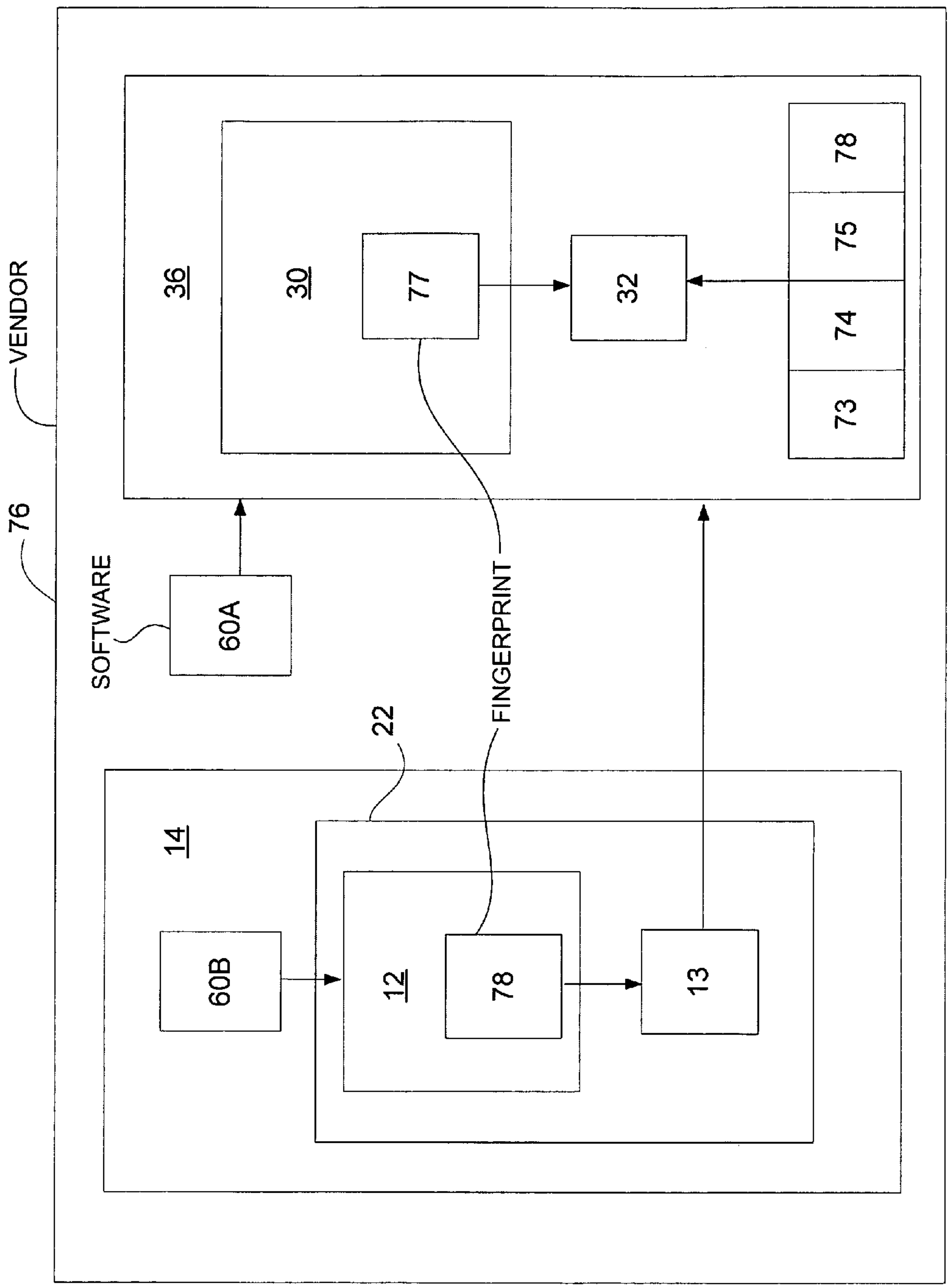

In FIG. 2C, electronic voting software 60 is installed in electronic voting machine 14 by DRE vendor 76, after testing by laboratory 71. In some aspects, fingerprint element 30 is arranged to generate digital fingerprint 77 prior to said installation of software 60 in machine 14 (software 60 is designated as 60A for this case). Fingerprint 77 also is referred to as a pre-installation digital fingerprint. Fingerprint element 12 is arranged to generate digital fingerprint 78 after the installation of software 60 in machine 14 (software 60 is designated as 60B for this case). In some aspects, fingerprint element 12 is arranged to generate digital fingerprint 78 contemporaneous with the installation of software 60 in machine 14. Fingerprint 78 also is referred to as an installation digital fingerprint. In these aspects, comparison element 32 is operatively arranged to compare the pre-installation and installation digital fingerprints to a digital fingerprint selected from the group comprising the certification, pre-test, and test digital fingerprints. That is the pre-installation and installation digital fingerprints are compared to fingerprints relating to software 60 at one of the previously described stages.

Figure 2D:
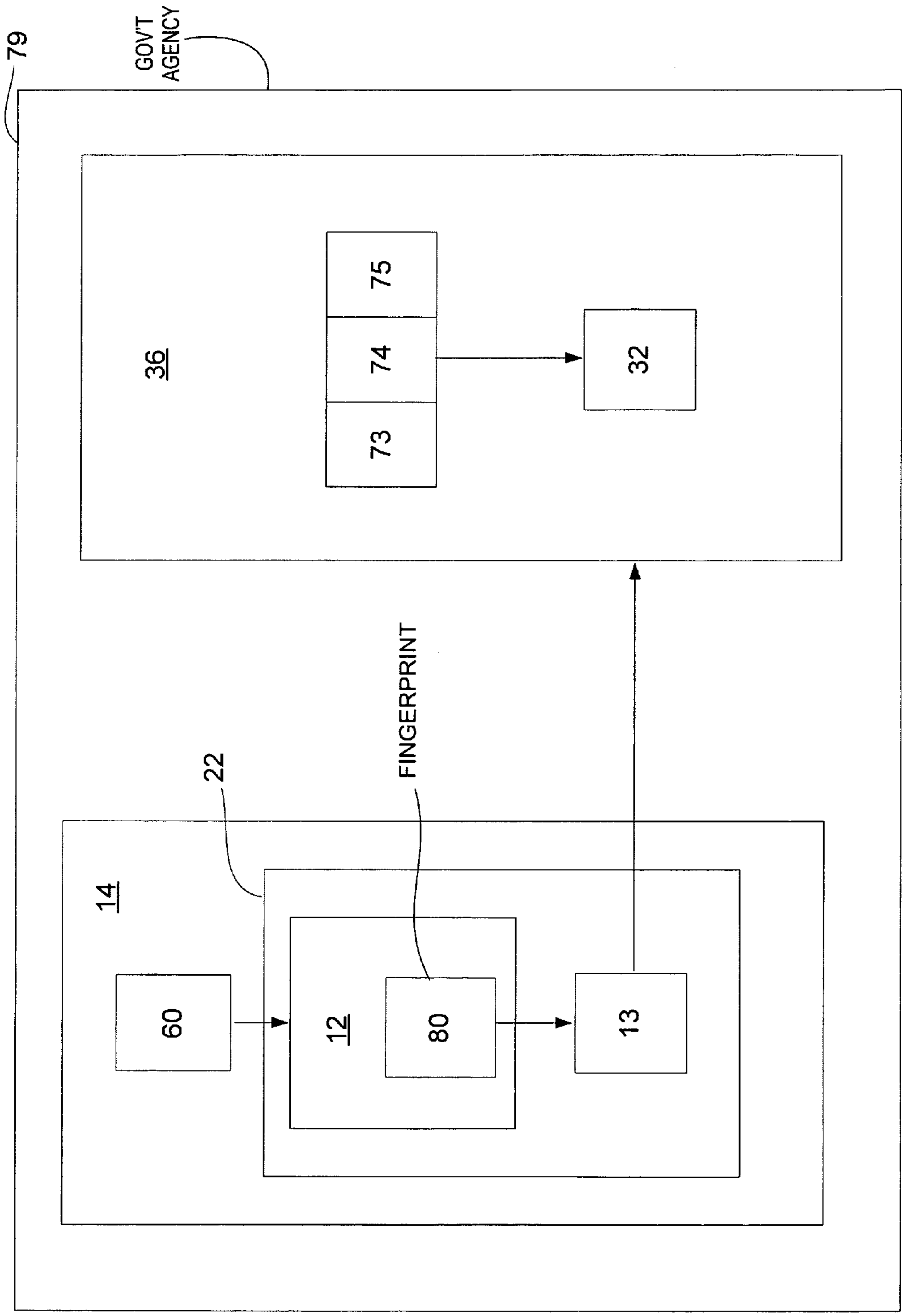

In FIG. 2D, machine 14 has been shipped to a government agency 79 after software 60 has been installed. By government agency, we mean any governmental entity or agency responsible for and/or conducting a voting process. In some aspects, fingerprint element 12 is arranged to generate digital fingerprint 80 after the government agency receives machine 14. In some aspects, fingerprint element 12 is arranged to generate digital fingerprint 80 contemporaneous with the receipt of machine 14 by government agency 79. Fingerprint 80 also is referred to as an agency digital fingerprint. In these aspects, comparison element 32 is operatively arranged to compare the agency digital fingerprint to a digital fingerprint selected from the group comprising the certification, pre-test, and test digital fingerprints.

Figure 2E:
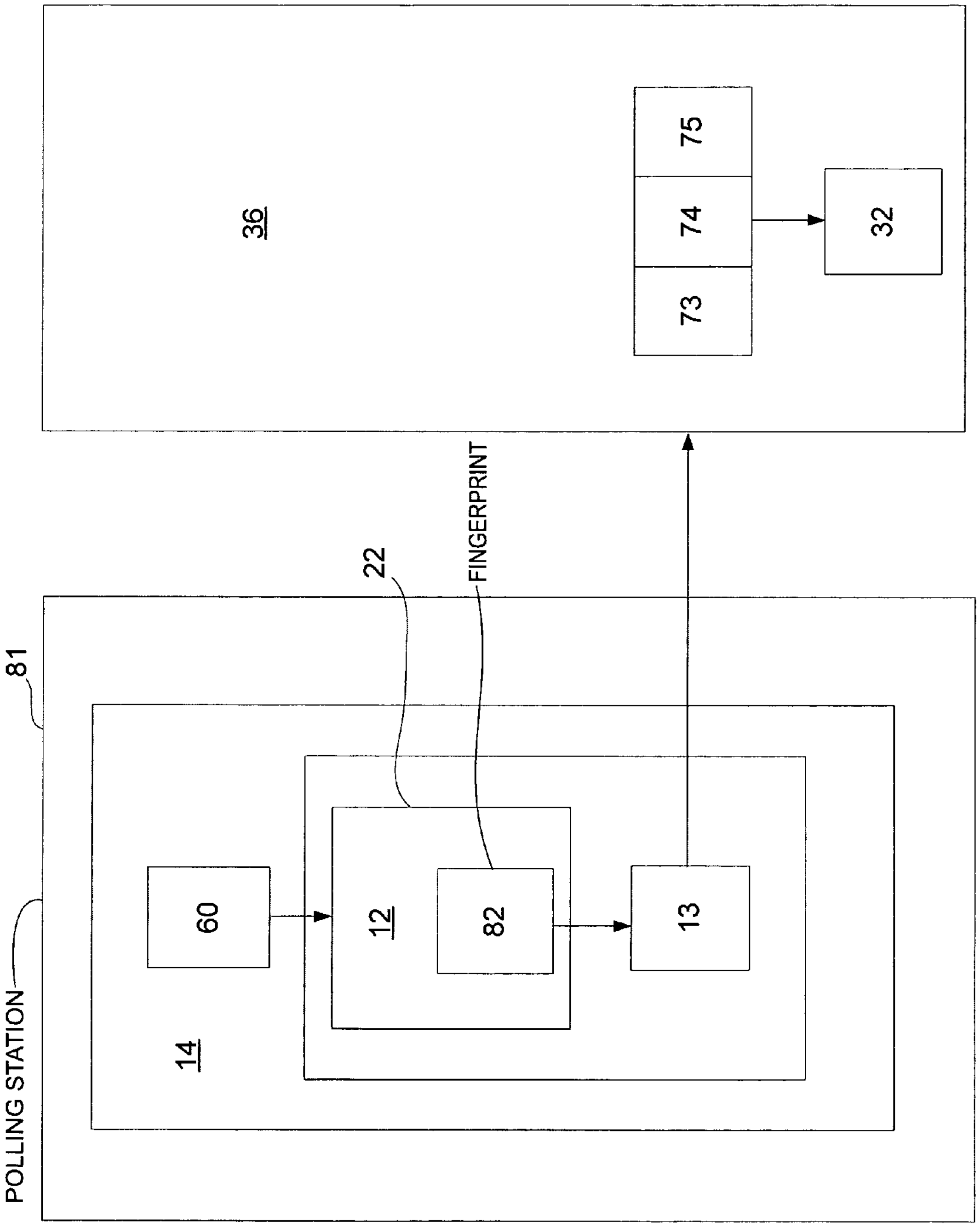

In FIG. 2E, system 10 is used to validate software 60 throughout the voting period. That is, while machine 14 is in polling station 81 and from the beginning of the voting period and up to the conclusion of the voting period. In some aspects, fingerprint element 12 is arranged to generate at least one digital fingerprint 82 prior to the conclusion. That is, element 12 generates a plurality of fingerprints 82 after the beginning of the voting period and up to the conclusion of the voting period. Fingerprint 82 also is referred to as an agency digital fingerprint. It should be understood that element 12 is not limited to generating any particular number of fingerprints 82 and is not limited to generating fingerprints 82 according to any particular schedule or at any particular time intervals. In some aspects, element 12 generates fingerprints 82 at random time intervals. In some aspects, element 12 generates fingerprints 82 at set times or time intervals. In some aspects, fingerprint element 12 is arranged to generate a digital fingerprint 82 after the conclusion of the voting period. In some aspects, fingerprint element 12 is arranged to generate a digital fingerprint 82 contemporaneous with the conclusion of the voting period. Fingerprint 82 also is referred to as a closing digital fingerprint. In these aspects, transmission element 13 transmits fingerprints 82 to computer 36 and comparison element 32 is operatively arranged to compare the agency digital fingerprint to a digital fingerprint selected from the group comprising the certification, pre-test, and test digital fingerprints. In FIGS. 2A through 2E, computer 36 is shown within the entity 70, laboratory 71, vendor 76, agency 79, and station 81, respectively. However, it should be understood that computer 36 does not have to be physically located at a subject facility. For example, in FIG. 2B, software 60 can be transmitted to computer 36 via a secure web site.

Figure 3:
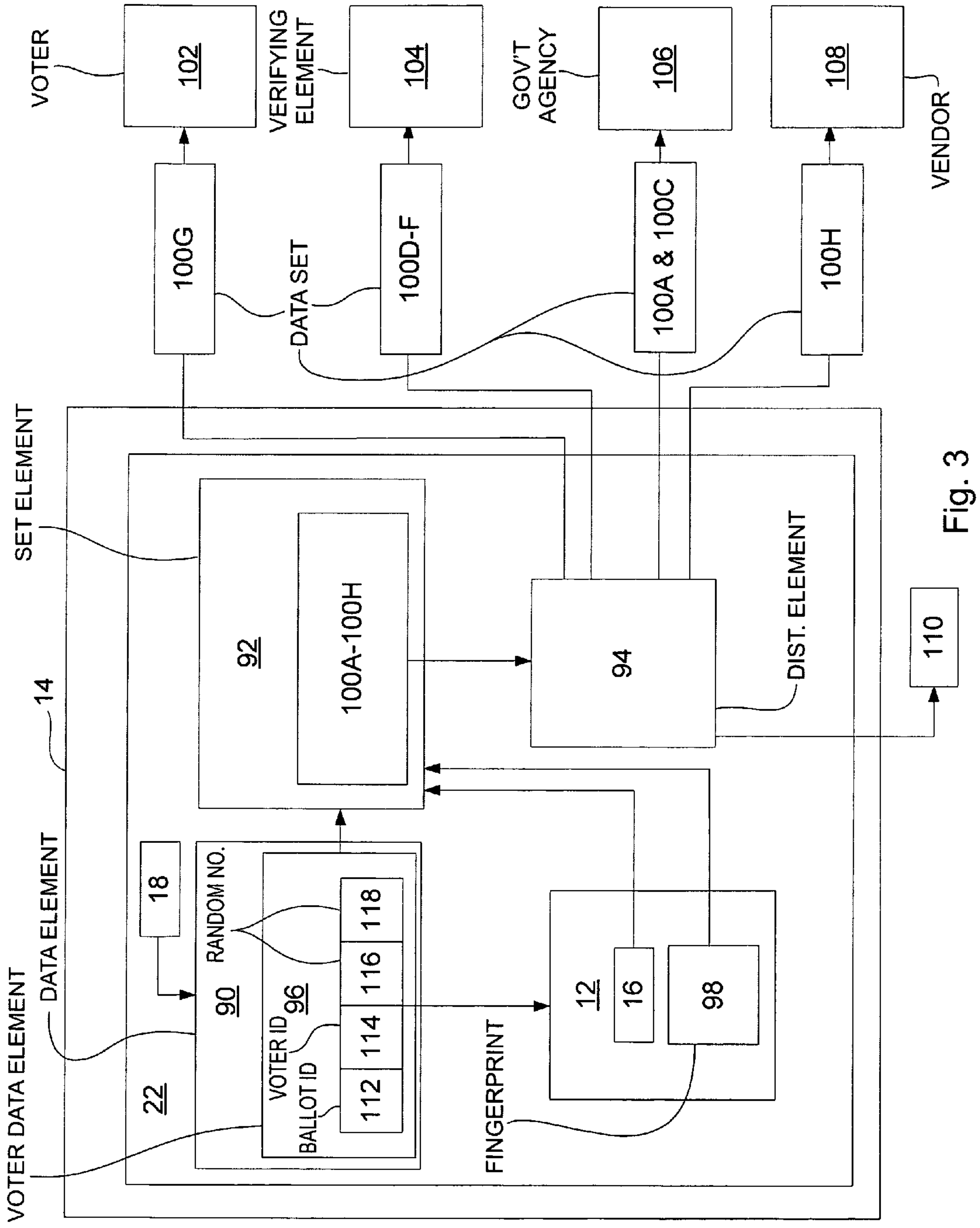
FIG. 3 is a block diagram illustrating the use of the system to form and distribute data sets to validate a voting process; and, FIGS. 4 through 13 are pictures of computer screens illustrating the use of the system to generate a digital fingerprint regarding a voting process.

FIG. 3 is a block diagrams illustrating the use of system 10 to form and distribute data sets to validate a voting process. FIG. 3 illustrate a system of "Checks and Balances" in conjunction with "Separation of Duties." These are time-tested principles that can be used to validate the results of any election. In particular, system 10 can validate in real time, producing results in a matter of seconds or minutes. In any voting process, there are multiple parties involved and there are multiple data items available from the voting process. Various of the data items can be separated between the involved parties, such that no party has all the data items, no party can reverse engineer an electronic vote record, and the anonymity of the voter is preserved. Further, a formal validation/certification process can be performed after a vote has been cast or a voting period has ended to determine whether electronic voting records have been tampered with and whether every vote has been counted as the respective voters intended.

In some aspects, the validation/certification process is performed by a combination of election auditing firm(s) and/or legal firm(s). The firms receive digital fingerprints generated by system 10 via any transmission means known in the art, for example, modems, telephone landlines, cellular phone technologies, larger area network (LAN)/wide area network (WAN), satellite communication technologies, and interface to an internet to transmit fingerprint 16. As described below, the firms receive respective electronic fingerprints of the files associated with software 60. These files include source code repositories for each DRE model produced by a DRE manufacturer and executable files on each DRE unit. In addition, detailed source code compiler information for each DRE model prior to deployment of DRE systems to elections sites is included. DRE systems already in deployment can be retrofitted with system 10. All aforementioned electronic fingerprints are useful as official records legally safeguarding software 60 during a voting process and providing a benchmark against which to measure breaches in the integrity of the voting system. In some aspects, copies of fingerprint certificates regarding software 60 are sent to legal entities affiliated with the election process prior to the official election event In some aspects, system 10 includes data element 90, set element 92, and distribution element 94, all located in computer 22. Data element 90 is operatively arranged to generate a plurality of voter data items 96 regarding a voter casting a vote using machine 14. Element 12 is arranged to generate at least one digital fingerprint 98, also referred to as a data digital fingerprint, of at least one item 96 in the plurality of voter data items 96. Set element 92 is operatively arranged to create a plurality of data sets 100 including digital fingerprint 16, digital fingerprint 98, and at least some of voter data items 96. As described above, no one data set 100 includes every data item 96. Distribution element 94 is operatively arranged to distribute data sets 80 to voter 102, who has cast a vote using machine 14, to verifying entity 104, for example, an entity as described supra, to government agency 106 supervising and/or responsible for a voting process, and to DRE vendor 108. In some aspects, comparison element 32 is operatively arranged to compare data sets 80.

In some aspects, voter data items 96 include ballot identification 112, voter identification 114, and random numbers 116 and 118. Set element 92 generates the following data sets. Data set 100A includes ballot identification 112, random number 116, and record 18 and is fingerprinted to generate a first fingerprint 98. Data set 100D includes first fingerprint 98. First fingerprint 98 is combined with random number 118 to create data set 100C. Data set 100F includes random number 118 and voter identification 114. Data set 100B includes first fingerprint 98, random number 118, and voter identification 114. Data set 100B is fingerprinted to create second fingerprint 98. Data set 100E includes second fingerprint 98. Data set 100G includes data set 100E and voter identification 114. Optional data set 100H includes ballot identification 112 and record 18. Data sets 100 are created in real time and are not linked to one another in any way. Each party receives their data set(s) on an ongoing basis (in real-time). Immediately after the conclusion of the voting period, the various parties receive aggregate data.

In some aspects, voter 102 is presented with an electronic ballot (not shown) that includes ballot identification 112, and then casts a vote on machine 14 and confirms the vote on machine 14. At the point of confirmation, element 92 creates data set 100A "on-the-fly" and element 90 fingerprints data set 100A to generate first digital fingerprint 98 (data set 100D). Element 94 transmits data set 100A to government agency 106 and transmits data set 100D to entity 104. Element 92 combines data set 100D with a random number 118 to create data set 100C. Element 92 combines random number 118 with voter identification 114 to create data set 100F. Element 94 transmits data set 100C to government agency 106 and transmits data set 100F to entity 104. Element 92 creates data set 100B "on-the-fly" after creating data set 100A. Element 92 fingerprints data set 100B to generate second fingerprint 98 (data set 100E) "on-the-fly." Element 94 transmits data set 100E to entity 104. Element 92 uses data set 100E to create data set 100G. Element 94 prints data set 100G as receipt 42 for voter 102. Element 92 creates data set 100H and element 94 transmits data set 100H to vendor 108. After the data sets are formed and distributed, all data at voting machine 14 is discarded or selected data items 96 pertaining to the actual votes and ballots are maintained on a separate server (not shown). In any case, no data items 96 identifying voter 102 are kept. Data sets 100 can be used for record keeping and later certification In some aspects, data sets 100 are used to certify record 18 as follows. It should be understood that certification can be performed by entity 104 or by any other party with access to data sets 100. Step 1 re-generates first fingerprint 98 using data set 100A (from agency 106) and designates the re-generated fingerprint as fingerprint 98*a*. Step 2 checks fingerprint 98*a* against data set 100D (from entity 104) to confirm first fingerprint 98 matches fingerprint 98*a*. If the fingerprints match, step 3 designates that record 18 is valid. Step 4 compares data sets 100C (from agency 106) and data set 100F (from entity 104) to determine if random number 118 matches in both data sets. If the numbers match, step 5 designates the fingerprint from data set 100C as fingerprint 98*b* and sends fingerprint 98*b* to entity 104. Step 6 checks fingerprint 98*b* with fingerprint 98 in data set 100D. If the fingerprints match, step 7 combines fingerprint 98*b* with data set 100F in entity 104 to re-generate second fingerprint 98 and designates the re-generated fingerprint as fingerprint 98*c*. Step 8 checks fingerprint 98*c* with second fingerprint 98 in data set 100E (entity 104). If fingerprints 98*c* and second fingerprint 98 match, step 9 designates that record 18 is valid. For step 10, voter 102 enters voter identification 114 from data set 100H using a secure web site interfaced with entity 104. In step 11, entity 104 returns fingerprint 98*c* from data set 100E to voter 102. In step 12, voter 102 compares fingerprint 98*c* to second fingerprint 98 in data set 100G to determine if their vote has been properly recorded. After steps 1-12 have been performed, entity 104, agency 106, and voter 102 each know (or could know) the connection between certain date items 96 and likewise will be unable to ascertain the connection between other data items 96 without immediate and real-time collaboration with the other parties. If voter 102 chooses, they may make voter identification 114 and second fingerprint 98 public information. However, neither of these data items reveals anything about the actual vote cast by voter 102. As always, agency 106 should have the means of printing each ballot and hand counting the results as a final form of certifying the vote count.

FIGS. 4 through 13 are pictures of computer screens illustrating the use of system 10 to generate a digital fingerprint regarding a voting process. The following should be viewed in light of FIG. 1-13. FIGS. 4-13 shown the use of the Legal Safeguarding Agent described in U.S. patent application Ser. No. 10/870,666. FIGS. 4 through 13 show the use of a secure web site to access files in a DRE system. That is, system 10 is not imbedded in the software or hardware associated with the voting process. FIGS. 4 through 10 illustrate generating a digital fingerprint of software used in a DRE system. It should be understood that the software can be associated with any of the locations or processes described in FIGS. 2A through 2E. For example, software 60 could be at the independent test laboratory 71. It also should be understood that the present invention is not limited to working with only the number of files shown in FIGS. 4 through 13.

Figure 4:
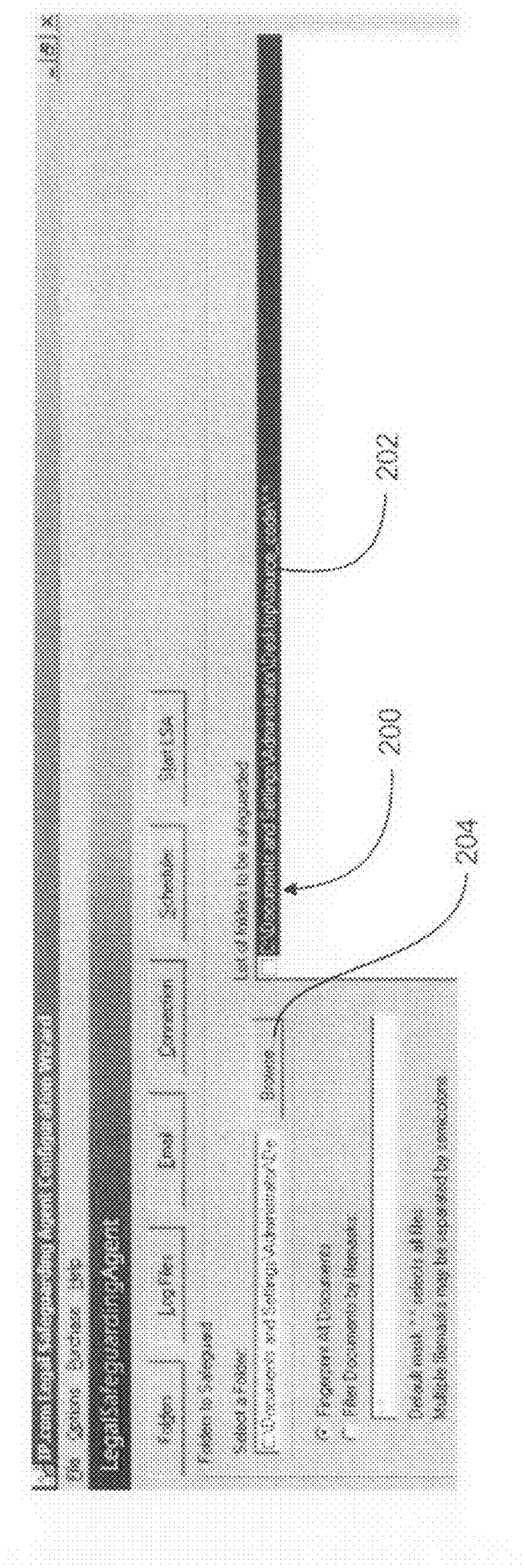

FIG. 4 illustrates the identification of the file path 200 for source code repository 202 representative of the software 60 used in a DRE system. The user has clicked on button 204 to generate pathway 200. Repository 202 contains individual files. In this example, there are two files (not shown). The user then clicks on a "continue" button (not shown) to process file 202.

Figure 5:
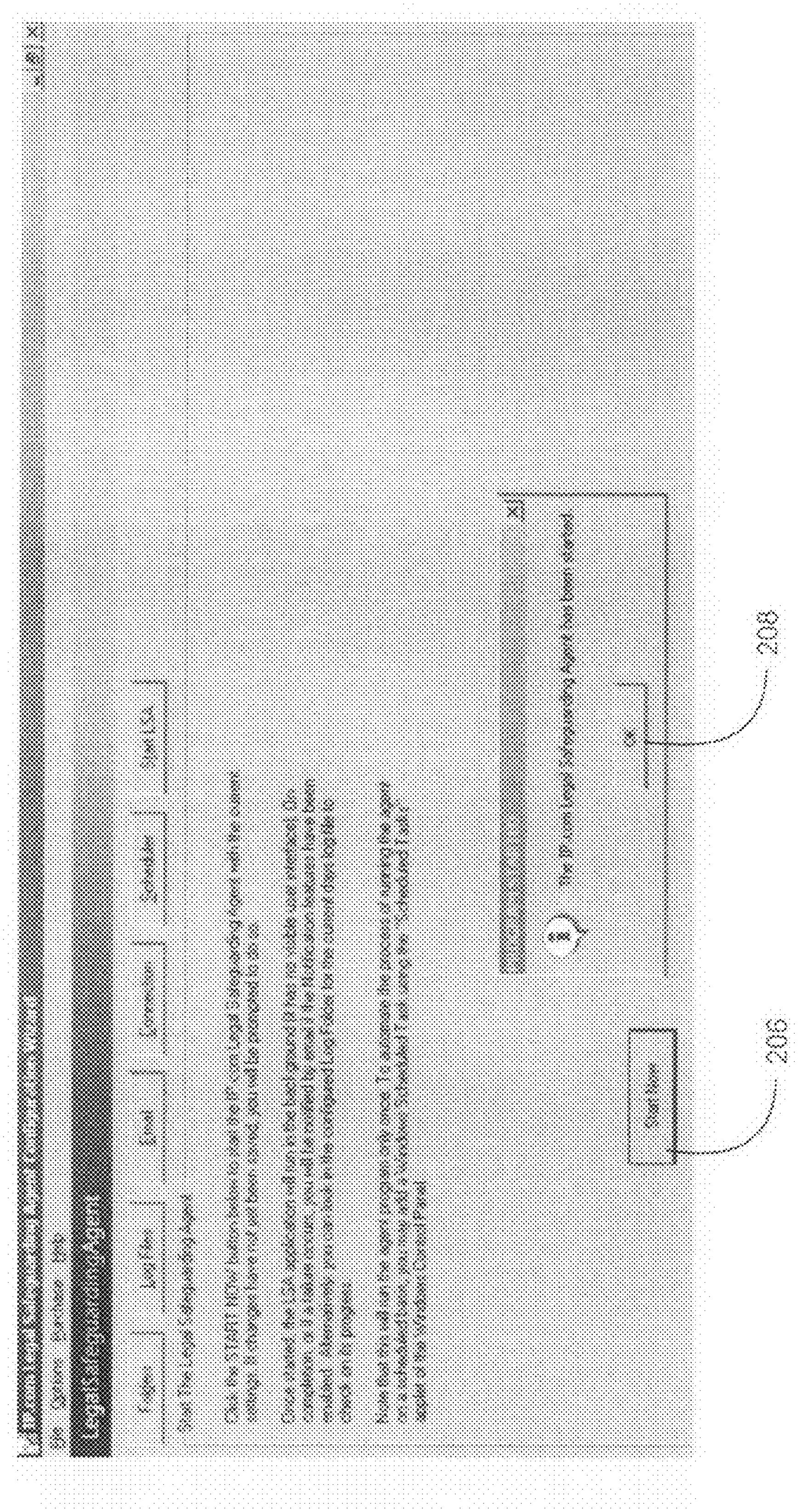

FIG. 5 illustrates the calculation, in process, of a respective fingerprint 34 for each file in source code repository 202. The user selects button 206 to start the fingerprinting process and then selects button 208. As FIG. 5 is being displayed, system 10 is generating the respective digital fingerprint for each file in repository 202, sending a copy of each fingerprint to a verifying entity, for example, entity 104, and creating a copy for the user.

Figure 6:
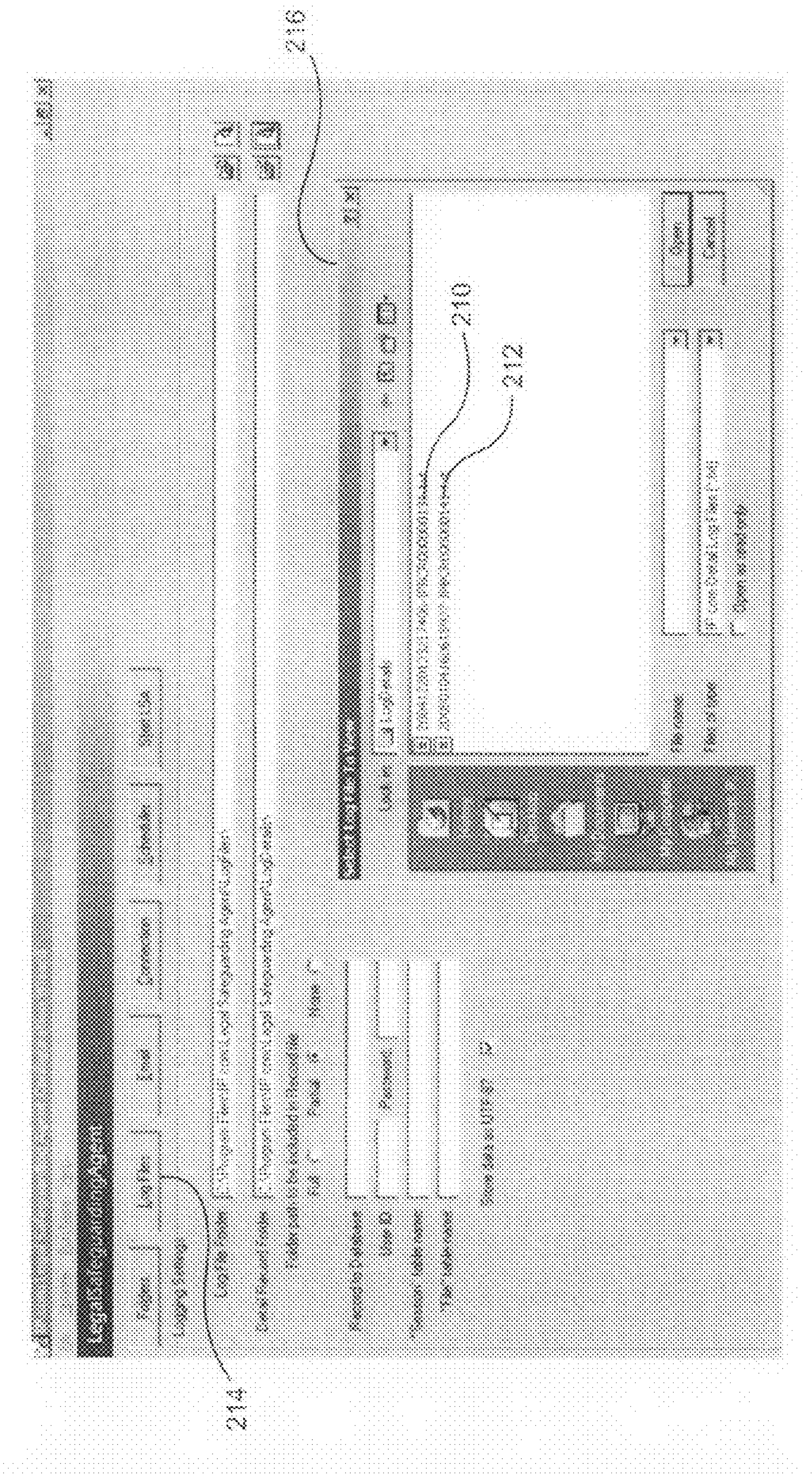

FIG. 6 illustrates the location of log files 210 and 212 containing the unique alphanumeric identification (digital fingerprint), generated by system 10, for each file in source code repository 202. After system 10 completes the generation, copying, and distribution of fingerprints described for FIG. 5, screen 6 is generated. The user selects button 214 to generate window 216, which lists files 210 and 212. Files 210 and 212 contain the respective digital fingerprints for the two files in repository 202.

Figure 7:
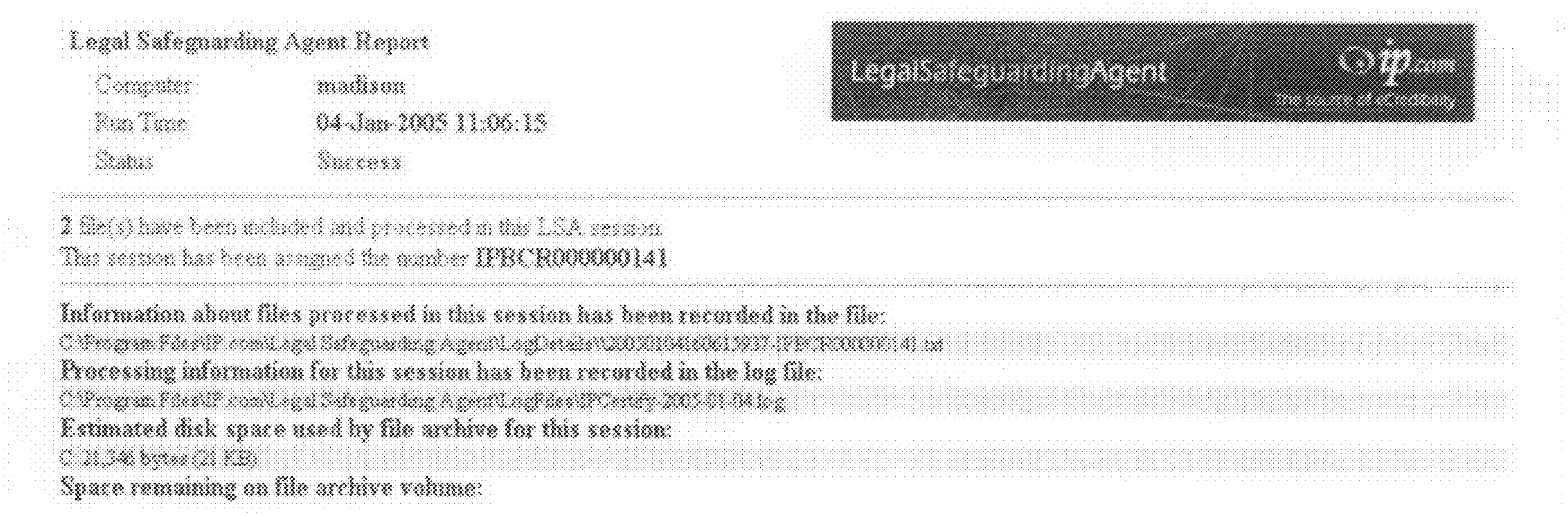

FIG. 7 illustrates a copy of a legally defensible electronic fingerprint certificate sent to the user by a verifying entity. The user for FIGS. 4-6 receives the certificate shown in FIG. 7. The certificate is generated by the verifying entity described in FIG. 5.

Figure 8:
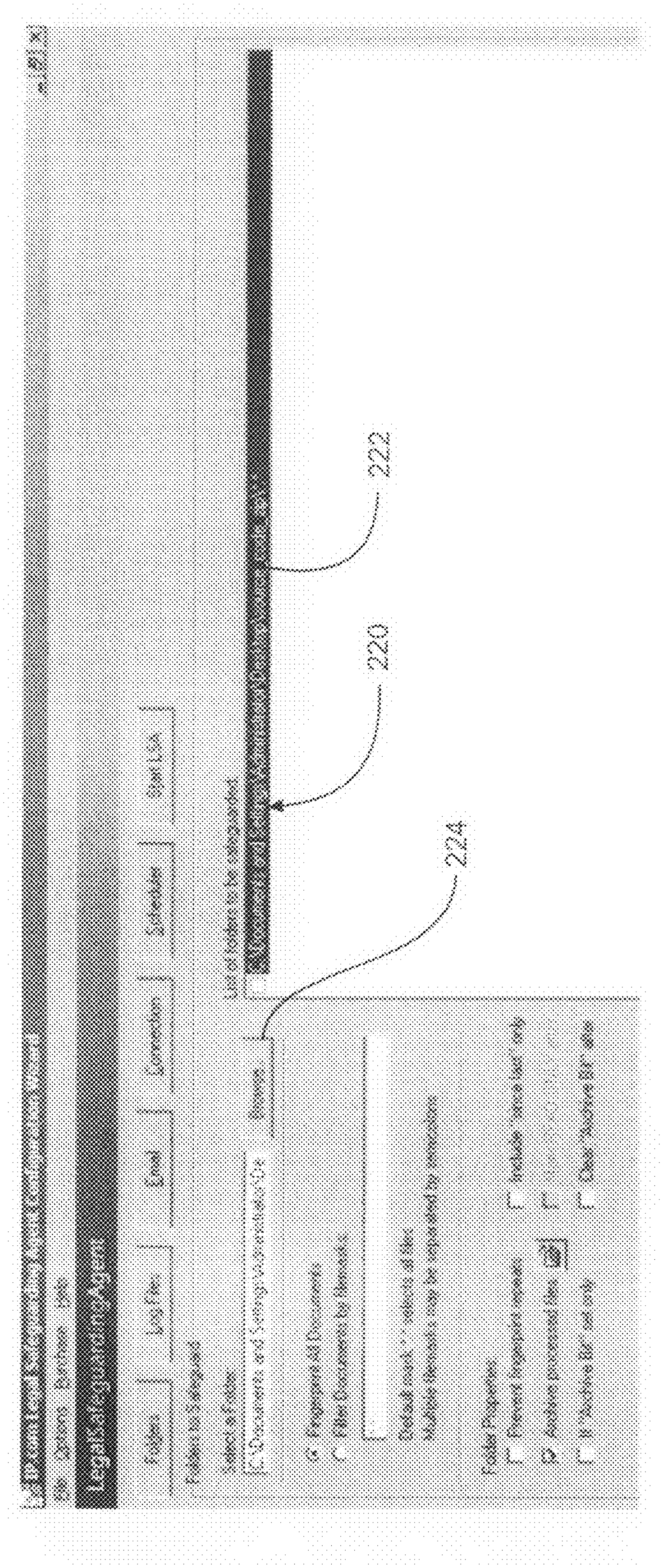

FIG. 8 illustrates the identification of the file path 220 for source code repository 222 representative of the software 60 used in a DRE system. The user has clicked on button 224 to generate pathway 220. Repository 222 contains a single compressed or zip file that may contain any number of individual files. The user then clicks on a "continue" button (not shown) to process file 222.

Figure 9:
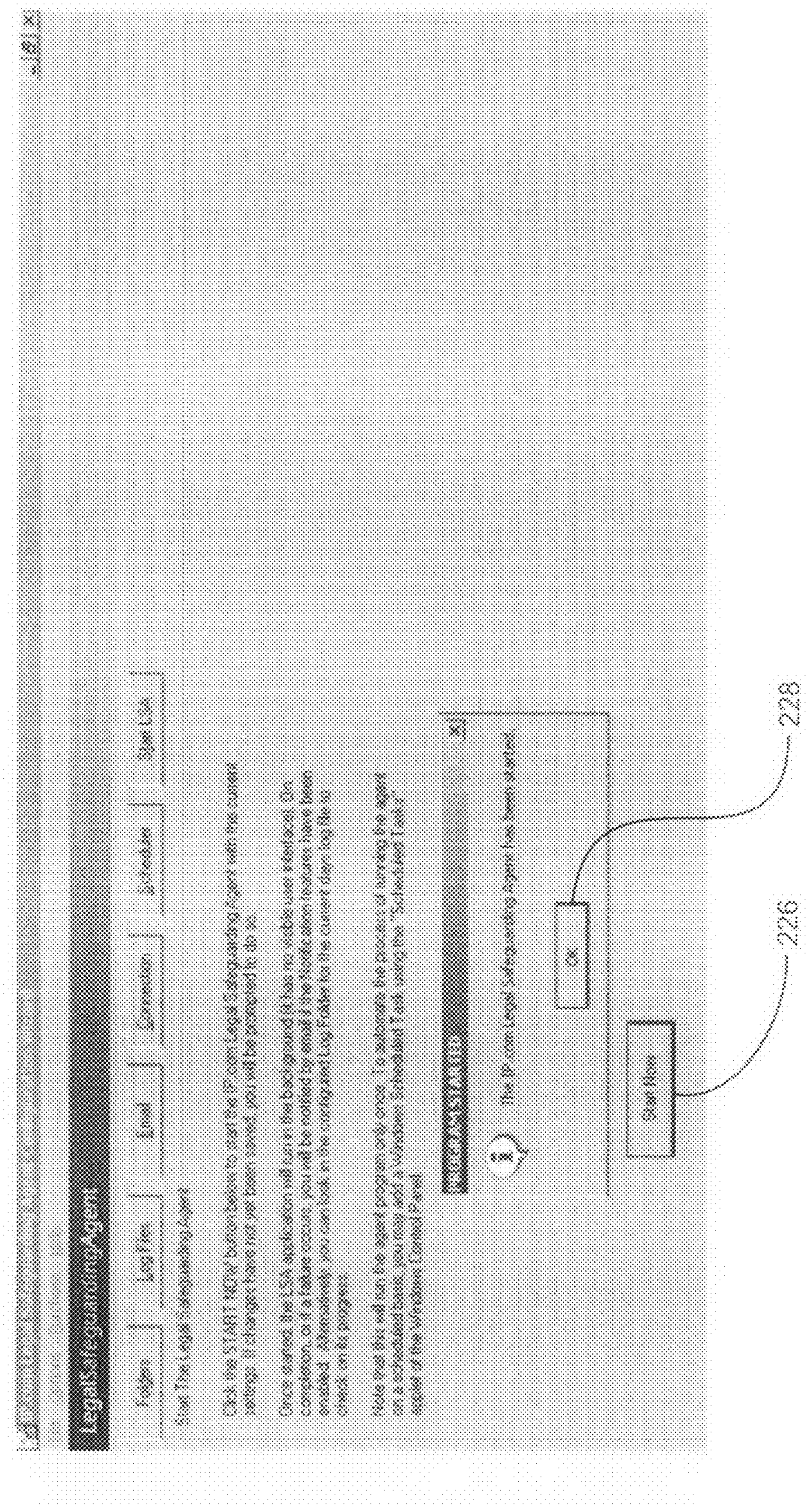

FIG. 9 illustrates the calculation, in process, of fingerprint 34 for the file in source code repository 222. The user selects button 226 to start the fingerprinting process and then selects button 228. As FIG. 9 is being displayed, system 10 is generating digital fingerprint 34 for the zip file in repository 222, sending a copy of the fingerprint to a verifying entity, for example, entity 104, and creating a copy for the user in FIG. 9. Although not shown here, the location of the fingerprint for the zip file can be displayed as described in FIG. 6.

Figure 10:
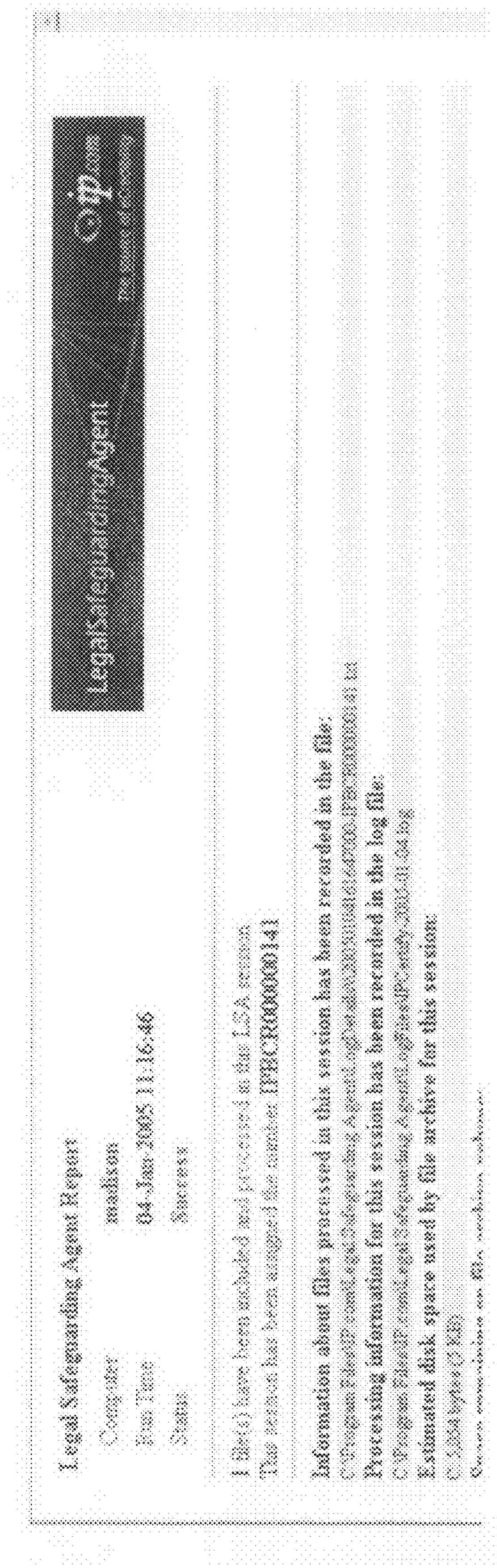

FIG. 10 illustrates a copy of a legally defensible electronic fingerprint certificate sent to the user by a verifying entity. The user for FIGS. 8 and 9 receives the certificate shown in FIG. 10. The certificate is generated by the verifying entity described in FIG. 9.

Figure 11:
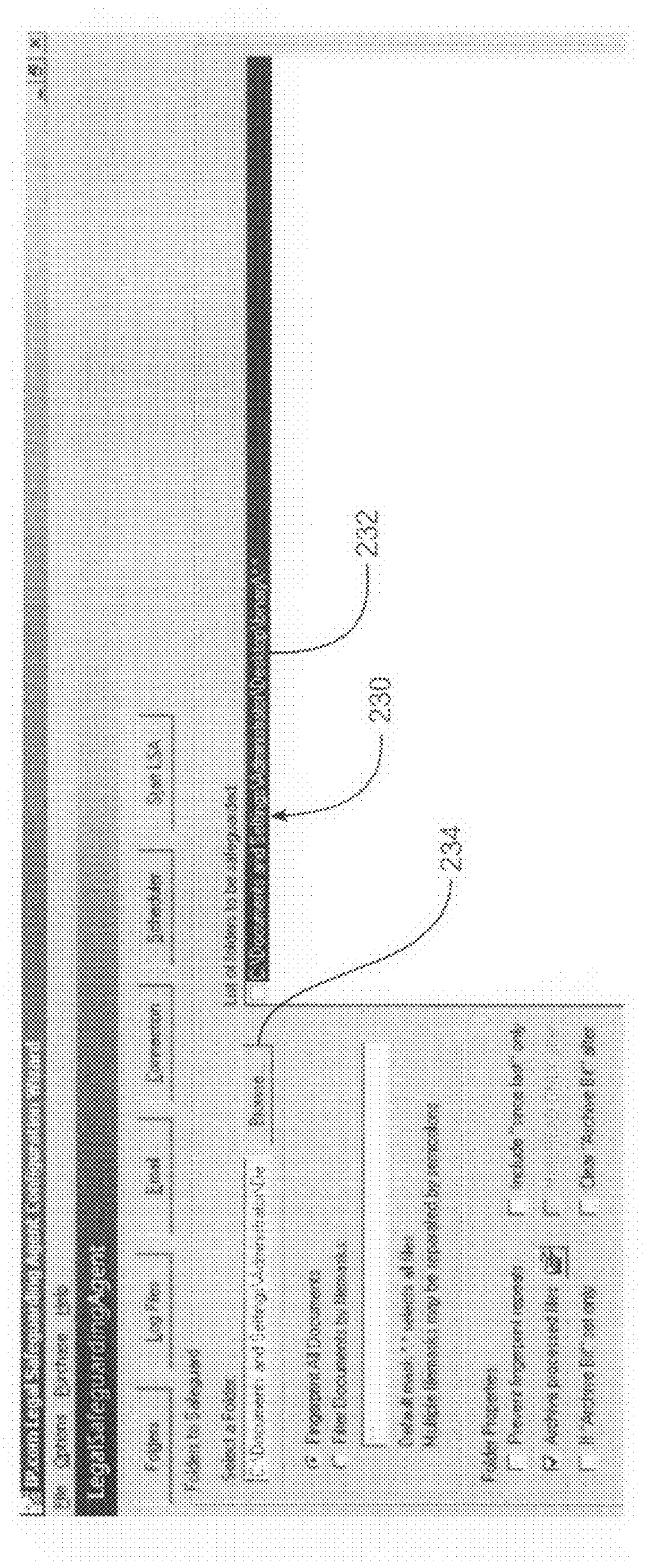

FIG. 11 illustrates the identification of the file path 230 for an electronic voting record 232 generated by a DRE system. The user has clicked on button 234 to generate pathway 230. The user then clicks on a "continue" button (not shown) to process file 232.

Figure 12:
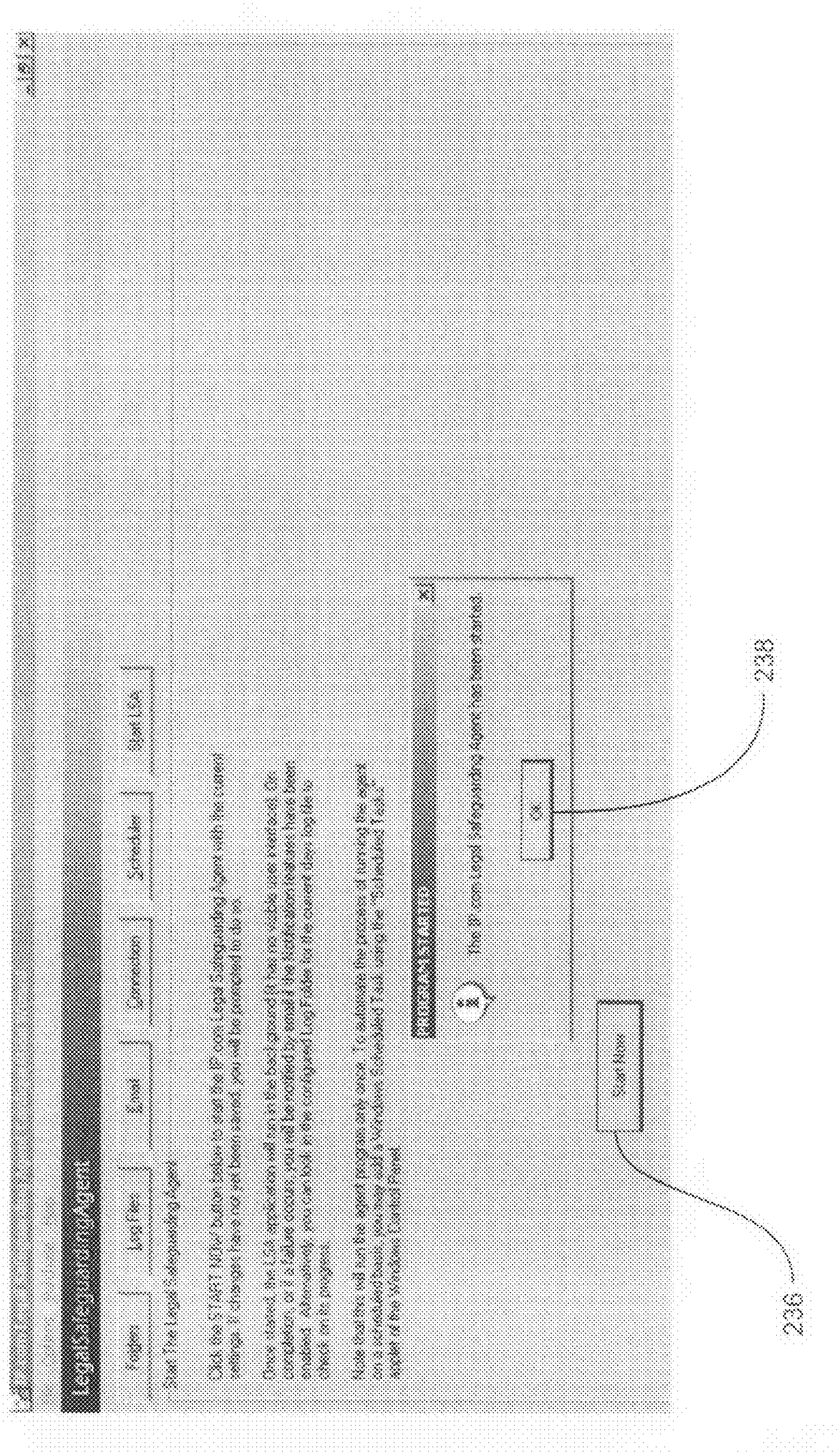

FIG. 12 illustrates the calculation, in process, of a fingerprint for electronic voting record 232. The user selects button 236 to start the fingerprinting process and then selects button 238. As FIG. 12 is being displayed, system 10 is generating the digital fingerprint for record 232, sending a copy of the fingerprint to a verifying entity, for example, entity 104, and creating a copy for the user in FIG. 12. Although not shown here, the location of fingerprint 34 for record 238 can be displayed as described in FIG. 6.

Figure 13:
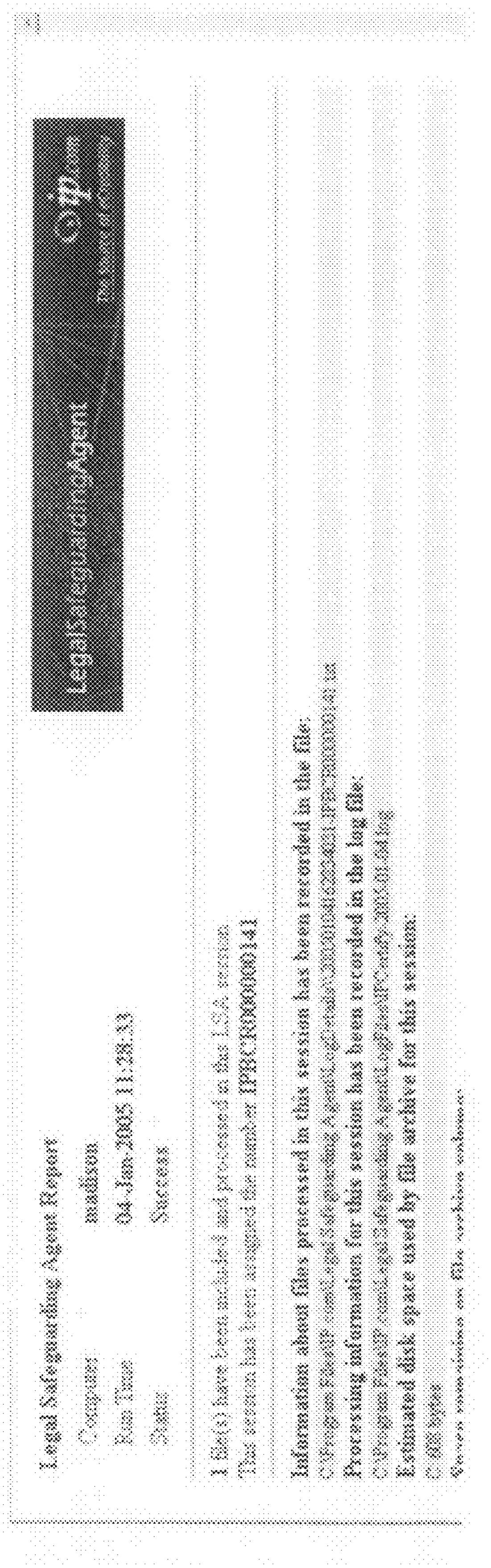

FIG. 13 illustrates a copy of a legally defensible electronic fingerprint certificate sent to the user by a verifying entity. The user for FIGS. 11 and 12 receives the certificate shown in FIG. 13. The certificate is generated by the verifying entity described in FIG. 12.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A computer-based method for verifying an electronic voting process, comprising the steps of:

generating an original digital authentication record of an electronic voting record at a first time, wherein a voter has cast a vote corresponding to said electronic record and the electronic voting record is in a Data Record Electronic (DRE) system internal storage media and includes the cast vote;

transmitting said original digital authentication record to an entity;

generating a validation digital authentication record of said electronic record at a second time later than said first time;

comparing said original and validation digital authentication records; and, displaying said comparison, where said steps of generating an original record and transmitting are performed by a first at least one specially programmed general purpose computer and where said steps of generating a validation record, comparing, and displaying are performed by a second at least one specially programmed general purpose computer.

2. The computer-based method as recited in claim 1 wherein transmitting said original digital authentication record further comprises transmitting said original digital authentication record to a first validating agency and wherein comparing said original and validation digital authentication records further comprises said first validating agency comparing said original and validation digital authentication records.

3. The computer-based method as recited in claim 1 further comprising:

interfacing said first and second at least one general purpose computers with an Internet.

4. The computer-based method as recited in claim 1 wherein generating said original and validation digital authentication records further comprises generating said original and validation digital authentication records in real time.

5. The computer-based method as recited in claim 1 further comprising:

generating voter information;

transmitting said voter information to said second at least one general purpose computer;

generating a verification receipt of said voter information; and, comparing said verification receipt to said voter information in said second at least one general purpose computer, where said steps of generating voter information, transmitting, and generating a verification receipt are performed by said first at least one general purpose computer and said step of comparing is performed by said second at least one general purpose computer.

6. The computer-based method as recited in claim 1 wherein a government agency has oversight of a voting process; and, said method further comprising:

generating a plurality of voter data items regarding said voter;

generating a data digital authentication record of at least one item in said plurality of voter data items;

creating a plurality of data sets comprising said original digital authentication record, said data digital authentication record, and said plurality of voter data items, where no data set in said plurality of data sets includes every data item in said plurality of voter data items;

distributing said plurality of data sets to said voter, to a second validating entity, and to said government agency; and, comparing said plurality of data sets after said distribution, where said steps of generating a plurality of voter data items and generating a data digital authentication record are performed by said first at least one general purpose computer and where said steps of creating, distributing, and comparing are performed by said second at least one general purpose computer.

7. The computer-based method as recited in claim 6 wherein said plurality of voter data items further comprises a ballot identification, a voter identification, and first and second random numbers; and, wherein said at least one item in said plurality of voter data items further comprises said voter identification.

8. The computer-based method as recited in claim 1 wherein a plurality of electronic records are generated and said plurality of respective electronic records are tabulated; and, said method further comprising:

generating a first tabulation digital authentication record of said tabulated plurality of respective electronic records at a first time;

generating a second tabulation digital authentication record of said tabulated plurality of respective electronic records at a second time later than said first time; and, comparing said first and second tabulation digital authentication records, where said step of generating a first tabulation digital authentication record is performed by said first at least one general purpose computer first and said steps of generating a second tabulation digital authentication record and comparing are performed by said second at least one general purpose computer.

9. A computer-based method for verifying an electronic voting process, comprising the steps of:

generating at least one pre-vote digital authentication record of voting software prior to a beginning of a specified voting period;

generating at least one voting digital authentication record of said software up to a conclusion of said specified voting period; and, comparing said at least one pre-vote and voting digital authentication records to at least one comparison digital authentication record, where said step of generating at least one pre-vote digital authentication record is performed by a first at least one specially programmed general purpose computer and said steps of generating at least one voting digital authentication record and comparing are performed by a second at least one specially programmed general purpose computer.

10. The computer-based method as recited in claim 9 wherein generating said at least one pre-vote and voting digital authentication records further comprises generating said at least one pre-vote and voting digital authentication records in real time.

11. The computer-based method as recited in claim 9 further comprising:

interfacing said first and second at least one general purpose computers with an Internet.

12. The computer-based method as recited in claim 9 wherein said second at least one general purpose computer is operated by a validating entity; and, said method further comprising:

transmitting said at least one pre-vote digital authentication records to said validating entity, where said step of transmitting is performed by said first at least one general purpose computer; and, wherein comparing said at least one pre-vote and voting digital authentication records to at least one comparison digital authentication record further comprises said second validating entity comparing said at least one pre-vote and voting digital authentication records to at least one comparison digital authentication record.

13. The computer-based method as recited in claim 9 wherein electronic voting software is certified and tested; wherein generating at least one pre-vote digital authentication record further comprises generating a certification digital authentication record of said software after said certification, generating a pre-test digital authentication record of said software prior to said testing, and generating a test digital authentication record of said software after said testing; and, wherein comparing said at least one pre-vote and voting digital authentication records to at least one comparison digital authentication record further comprises comparing said certification, pre-test, and test digital authentication records.

14. The computer-based method as recited in claim 13 wherein said software is installed in an electronic voting machine after said testing; wherein generating at least one pre-vote digital authentication record further comprises generating a pre-installation digital authentication record of said software prior to said installation and generating an installation digital authentication record of said software after said installation; and, wherein comparing said at least one pre-vote and voting digital authentication records to at least one comparison digital authentication record further comprises comparing said pre-installation and installation digital authentication records to a digital authentication record selected from the group consisting of said certification, pre-test, and test digital authentication records.

15. The computer-based method as recited in claim 14 wherein said voting machine is received by a government agency; wherein generating at least one pre-vote digital authentication record further comprises generating an agency digital fingerprint of said software after said receipt; and, wherein comparing said at least one pre-vote and voting digital authentication records to at least one comparison digital authentication record further comprises comparing said agency digital authentication record to a digital authentication record selected from the group consisting of said certification, pre-test, and test digital authentication records.

16. The computer-based method as recited in claim 9 wherein generating at least one voting digital authentication record further comprises generating said at least one voting digital authentication record at random time intervals.

17. The computer-based method as recited in claim 9 wherein generating at least one voting digital authentication record further comprises generating said at least one voting digital authentication record at set times.

18. A computer-based system for verifying an electronic voting process, comprising:

a first authentication record element operatively arranged to generate an original digital authentication record of an electronic voting record at a first time, wherein a voter has cast a vote corresponding to said electronic record and the electronic voting record is in a Data Record Electronic (DRE) system internal storage media and includes the cast vote;

a transmission element operatively arranged to transmit said original digital authentication record to an entity;

a second authentication record element operatively arranged to generate a validation digital authentication record of said electronic voting record at a second time later than said first time; and, a comparison element operatively arranged to compare said original and validation digital authentication records, where said first authentication record element and said transmission element are located in a first at least one specially programmed general purpose computer and where said second authentication record element and said comparison element are located in said second at least one specially programmed general purpose computer.

19. The computer-based system of claim 18 wherein said first authentication record element is embedded in a voting machine.

20. The computer-based system of claim 18 further comprising:

an Internet interface between said first and second general purpose computers.

21. The computer-based system of claim 18 wherein said second at least one specially programmed general purpose computer is operated by a first validating entity.

22. The computer-based system of claim 18 wherein said first authentication record element is arranged to generate said original digital authentication record in real time and said second authentication record element is arranged to generate said validation digital authentication record in real time.

23. The computer-based system of claim 18 further comprising:

a receipt element operatively arranged to generate voter information and a verification receipt comprising said voter information, where said receipt element is located in said first at least one specially programmed computer; and, wherein said transmission element is operatively arranged to transmit at least portions of said voter information to said second at least one general purpose computer and said comparison element is operatively arranged to compare said verification receipt to said at least portions of said voter information in said second at least one general purpose computer.

24. The computer-based system of claim 18 wherein a government agency has oversight over a voting process; and, said system further comprising:

a data element operatively arranged to generate a plurality of voter data items regarding said voter and to generate a data digital authentication record of at least one item in said plurality of voter data items;

a set element operatively arranged to create a plurality of data sets comprising said original digital authentication record, said data digital authentication record, and said plurality of voter data items, where no data set in said plurality of data sets includes every data item in said plurality of voter data items; and, a distribution element operatively arranged to distribute said plurality of data sets to said voter, to a second verifying entity, and to said government agency, where said data element, said set element, and said distribution element are located in said first at least one general purpose computer; and, wherein said comparison element is operatively arranged to compare said plurality of data sets.

25. The computer-based system of claim 24 wherein said plurality of voter data items further comprises a ballot identification, a voter identification, and first and second random numbers; and, wherein said at least one item in said plurality of voter data items further comprises said voter identification.

26. The computer-based system of claim 18 wherein a plurality of respective electronic records of votes are generated and said plurality of respective electronic records are tabulated; and, wherein said first digital authentication record element is operatively arranged to generate a first tabulation digital authentication record of said tabulated plurality of respective electronic records at a first time, said second digital authentication record element is operatively arranged to generate a second tabulation digital authentication record of said tabulated plurality of respective electronic records at a second time after said first time, and said comparison element is operatively arranged to compare said first and second tabulation digital authentication records.

27. A computer-based system for verifying an electronic voting process, comprising:

a first authentication record element operatively arranged to generate at least one voting digital authentication record of voting software up to a conclusion of a voting period;

a second authentication record element operatively arranged to generate at least one pre-vote digital authentication record of said voting software prior to a beginning of a voting period; and, a comparison element operatively arranged to compare said at least one pre-vote and voting digital authentication records to at least one comparison digital authentication record, where said first authentication record element is located in a first at least one specially programmed computer and said second authentication record element and said comparison element are located in a second at least one specially programmed computer.

28. The computer-based system of claim 27 further comprising:

an Internet interface between said first and second general purpose computers.

29. The computer-based system of claim 27 wherein said first authentication record element is arranged to generate said at least one pre-vote digital authentication record in real time and said second authentication record element is arranged to generate said at least one voting digital authentication record in real time.

30. The computer-based system of claim 27 wherein said first authentication record element is arranged to generate said at least one voting digital authentication record at random time intervals.

31. The computer-based system of claim 27 wherein said first authentication record element is arranged to generate said at least one voting digital authentication record at set time intervals.

32. The computer-based system of claim 27 wherein electronic voting software is certified and tested; wherein said second authentication record element is arranged to generate a certification digital authentication record of said software after said certification, a pre-test digital authentication record of said certified software prior to said testing, and a test digital authentication record of said software after said testing; and, wherein said comparison element is operatively arranged to compare said certification, pre-test, and test digital authentication records.

33. The computer-based system of claim 32 wherein said software is installed in said electronic voting machine; wherein said second authentication record element is arranged to generate a pre-installation digital authentication record of said software prior to said installation and an installation digital authentication record of said software after said installation; and, wherein said comparison element is operatively arranged to compare said pre-installation and installation digital authentication records to a digital authentication record selected from the group consisting of said certification, pre-test, and test digital authentication records.

34. The computer-based system of claim 33 wherein said voting machine is received by a government agency; wherein said second authentication record element is arranged to generate an agency digital authentication record of said software after said receipt; and, wherein said comparison element is operatively arranged to compare said agency digital authentication record to a digital authentication record selected from the group consisting of said certification, pre-test, and test digital authentication records.

35. A computer-based method for verifying an electronic voting process, comprising the steps of:

generating an original digital authentication record of an electronic voting record at a first time, wherein a voter has cast a vote corresponding to said electronic record and the electronic voting record is in a Data Record Electronic (DRE) system internal storage media and includes the cast vote;

transmitting said original digital alphanumeric identification to an entity, generating a validation digital alphanumeric identification of said electronic voting record at a second time later than said first time; and, comparing said original and validation digital alphanumeric identifications, where said steps of generating an original alphanumeric identification and transmitting are performed by a first at least one specially programmed general purpose computer, and where said steps of generating a validation alphanumeric identification and comparing are performed by a second at least one specially programmed general purpose computer.

36. A computer-based method for verifying an electronic voting process, comprising the steps of:

generating at least one voting digital alphanumeric identification of voting software up to a conclusion of a specified voting period; and, comparing said at least one voting digital alphanumeric identification to at least one comparison digital alphanumeric identification of said voting software, where said step of generating is performed by a first at least one specially programmed general purpose computer and said step of comparing is performed by a second at least one specially programmed general purpose computer.

37. A computer-based system for verifying an electronic voting process, comprising:

a first authentication record element operatively arranged to generate an original digital authentication record of an electronic voting record at a first time, wherein a voter has cast a vote corresponding to said electronic record and the electronic voting record is in a Data Record Electronic (DRE) system internal storage media and includes the cast vote;

a transmission element operatively arranged to transmit said original digital authentication record to an entity;

a second authentication record element operatively arranged to generate a validation digital authentication record of said electronic record at a second time later than said first time; and, a comparison element operatively arranged to compare said original and validation digital authentication records and to detect a difference between said original and validation digital authentication records, where said first authentication record element and said transmission element are located in a first at least one specially programmed general purpose computer and where said second authentication record element and said comparison element are located in a second at least one specially programmed general purpose computer.

38. A computer-based system for verifying an electronic voting process, comprising:

an authentication record element operatively arranged to generate at least one voting digital authentication record of voting software up to a conclusion of a voting period; and, a comparison element operatively arranged to compare said at least one voting digital authentication record to at least one comparison digital authentication record of said voting software, where said authentication record element is located in a first at least one specially programmed computer and said comparison element is located in a second at least one specially programmed computer.

* * * * *